(12) United States Patent
Kang et al.

(10) Patent No.: US 11,974,326 B2
(45) Date of Patent: Apr. 30, 2024

(54) METHODS FOR SELECTING AND CONFIGURING RANDOM ACCESS CHANNEL, ACCESS DEVICE AND NETWORK DEVICE

(71) Applicant: DATANG MOBILE COMMUNICATIONS EQUIPMENT CO., LTD., Beijing (CN)

(72) Inventors: Shaoli Kang, Beijing (CN); Deshan Miao, Beijing (CN); Shaohui Sun, Beijing (CN); Yingmin Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 408 days.

(21) Appl. No.: 17/612,198

(22) PCT Filed: Mar. 24, 2020

(86) PCT No.: PCT/CN2020/080921
§ 371 (c)(1),
(2) Date: Nov. 17, 2021

(87) PCT Pub. No.: WO2020/233224
PCT Pub. Date: Nov. 26, 2020

(65) Prior Publication Data
US 2022/0248470 A1    Aug. 4, 2022

(30) Foreign Application Priority Data
May 21, 2019   (CN) .......................... 201910424589.0

(51) Int. Cl.
*H04W 74/0833* (2024.01)
*H04B 7/185* (2006.01)
*H04W 72/044* (2023.01)

(52) U.S. Cl.
CPC .... *H04W 74/0833* (2013.01); *H04B 7/18543* (2013.01); *H04W 72/044* (2013.01)

(58) Field of Classification Search
CPC .......... H04W 74/0833; H04W 72/044; H04W 72/0446; H04W 72/0453; H04B 7/18543;
(Continued)

(56) References Cited

U.S. PATENT DOCUMENTS 8,169,944 B2 *   5/2012   Walton ................ H04L 25/0242
                                          370/347
2015/0003427 A1   1/2015   Wan et al.
(Continued)

FOREIGN PATENT DOCUMENTS

| CN | 103298136 A | 9/2013 |
| CN | 109479331 A | 3/2019 |
| EP | 3313015 A1 | 4/2018 |

OTHER PUBLICATIONS

Motorola Mobility, et al. "PRACH for an NR carrier supporting multiple numerologies" 3GPP TSG RAN WG1 Meeting #88 R1-1703045, Feb. 17, 2017, entire document.
(Continued)

*Primary Examiner* — Marisol Figueroa
(74) *Attorney, Agent, or Firm* — Ladas & Parry, LLP (57) ABSTRACT

Methods for selecting and configuring a random access channel, an access device and a network device are provided. The method includes: obtaining parameter information and time-frequency resource allocation information corresponding to at least two types of random access channels, the parameter information including a subcarrier spacing and a preamble sequence, a random access channel bandwidth obtained in accordance with the subcarrier spacing and a length of the preamble sequence being smaller than or equal to a maximum transmission bandwidth of a satellite access device, the subcarrier spacing including a reference
(Continued)

value of a maximum frequency offset to be resisted by a satellite system; selecting target parameter information from the parameter information in accordance with a capability and an operating scenario of the access device and a frequency offset proportion of each random access channel; and selecting a random access channel in accordance with the target parameter information, and transmitting a random access signal in accordance with the time-frequency resource allocation information.

20 Claims, 2 Drawing Sheets

(58) Field of Classification Search
CPC . H04B 7/1851; H04B 7/18539; H04B 7/1853
See application file for complete search history.

(56) References Cited

U.S. PATENT DOCUMENTS

| 2019/0159265 | A1 | 5/2019 | Wan et al. |
| 2019/0215877 | A1* | 7/2019 | Qian ............... H04L 27/0014 |
| 2020/0178316 | A1* | 6/2020 | Liu ..................... H04W 72/23 |

OTHER PUBLICATIONS

NTT DOCOMO, Inc. "Design for RACH Procedure for NR" 3GPP TSG RAN WG1 Meeting #86 R1-167378, Aug. 26, 2016, entire document.
PCT International Search Report for PCT/CN2020/080921 dated Jun. 30, 2020.
PCT Written Opinion for PCT/CN2020/080921 dated Jun. 30, 2020.

* cited by examiner

METHODS FOR SELECTING AND CONFIGURING RANDOM ACCESS CHANNEL, ACCESS DEVICE AND NETWORK DEVICE

CROSS-REFERENCE TO RELATED APPLICATIONS

This application is the U.S. national phase of PCT Application No. PCT/CN2020/080921 filed on Mar. 24, 2020, which claims a priority of the Chinese patent application No. 201910424589.0 filed in China on May 21, 2019, the disclosures of which are incorporated herein by reference in their entireties.

TECHNICAL FIELD

The present disclosure relates to the field of communication application technology, in particular to methods for selecting and configuring a random access channel, an access device and a network device.

BACKGROUND

For a ground $5^{th}$-Generation (5G) mobile communication system, a bandwidth of its single carrier is defined in accordance with integral multiples of 50 MHz at a high frequency band, e.g., 50 MHz as a minimum value, 100 MHz, 200 MHz or 400 MHz. Taking a sub-carrier spacing of 120 KHz as an example, specific parameters at the bandwidths are shown in Table 1. The setting of a random access channel is not affected on the basis of this bandwidth definition.

TABLE 1

| Defined bandwidth | 50 MHz | 100 MHz | 200 MHz | 400 MHz |
| --- | --- | --- | --- | --- |
| The quantity of Physical Radio Bearers (PRBs) | 32 | 66 | 132 | 264 |
| Active bandwidth | 46.08 MHz | 95.04 MHz | 190.08 MHz | 380.16 MHz |

For a satellite mobile communication system adopting the ground 5G system, the minimum bandwidth of the ground 5G system is defined as 50 MHz in the case of the high frequency band. Due to the restraint on transmission power of a terminal, it is difficult for an uplink transmission bandwidth of the terminal at a low power level to reach the minimum bandwidth defined in the ground 5G system, so it is impossible for the minimum bandwidth to be adapted to the access of a satellite terminal at a low power level.

SUMMARY

An object of the present disclosure is to provide methods for selecting and configuring a random access channel, an access device and a network device, so as to solve the problem that the minimum bandwidth defined in the ground 5G system is large in the case of the high frequency band and it is impossible for the minimum bandwidth to be adapted to the access of the satellite terminal at a low power level.

In one aspect, the present disclosure provides in some embodiments a method for selecting a random access channel for an access device, including: obtaining parameter information and time-frequency resource allocation information corresponding to at least two types of random access channels, the parameter information corresponding to each type of random access channel including a subcarrier spacing and a preamble sequence, a random access channel bandwidth obtained in accordance with the subcarrier spacing and a length of the preamble sequence being smaller than or equal to a maximum transmission bandwidth of a satellite access device, the subcarrier spacing including a reference value of a maximum frequency offset to be resisted by a satellite system; selecting target parameter information from the parameter information in accordance with a capability of the access device, an operating scenario of the access device and a frequency offset proportion of the random access channel; and selecting a random access channel in accordance with the target parameter information, and transmitting a random access signal in accordance with the time-frequency resource allocation information.

In a possible embodiment of the present disclosure, the selecting the target parameter information from the parameter information in accordance with the capability of the access device, the operating scenario of the access device and the frequency offset proportion of the random access channel includes: selecting a target random access channel bandwidth smaller than or equal to a maximum transmission bandwidth of the access device from the parameter information in accordance with the capability of the access device; selecting from the parameter information a target subcarrier spacing greater than the maximum frequency offset to be resisted by the access device in accordance with the operating scenario of the access device; and selecting a target preamble sequence from the parameter information in accordance with the frequency offset proportion of the random access channel.

In a possible embodiment of the present disclosure, the selecting the target preamble sequence from the parameter information in accordance with the frequency offset proportion of the random access channel includes: in the case that there is a plurality of same preamble sequences in the parameter information, selecting preamble sequences with a minimum frequency offset proportion from the plurality of same preamble sequences to obtain a target preamble sequence set; in the case that the target preamble sequence set includes different preamble sequences, determining the target preamble sequence in accordance with a frequency offset proportion of a random access channel corresponding to a shortest preamble sequence in the target preamble sequence set; and in the case that the target preamble sequence set does not include different preamble sequences, determining the preamble sequence in the target preamble sequence set as the target preamble sequence.

In a possible embodiment of the present disclosure, the determining the target preamble sequence in accordance with the frequency offset proportion of the random access channel corresponding to the shortest preamble sequence in the target preamble sequence set includes: in the case that the frequency offset proportion of the random access channel corresponding to the shortest preamble sequence in the target preamble sequence set is smaller than or equal to a first predetermined threshold, selecting the shortest preamble sequence as the target preamble sequence; in the case that the frequency offset proportion of the random access channel corresponding to the shortest preamble sequence in the target preamble sequence set is greater than or equal to a second predetermined threshold, selecting a longest preamble sequence as the target preamble sequence; and in the case that the frequency offset proportion of the random access channel corresponding to the shortest preamble sequence in the target preamble sequence set is greater than the first predetermined threshold and smaller than the second predetermined threshold, selecting a preamble sequence corresponding to a minimum random access channel bandwidth as the target preamble sequence, the second predetermined threshold being greater than the first predetermined threshold.

In a possible embodiment of the present disclosure, the parameter information corresponding to each type of random access channel further includes repetition times of the preamble sequence of the random access channel. Subsequent to obtaining the parameter information corresponding to the at least two types of random access channels, the method further includes determining the repetition times of the preamble sequence of the random access channel in accordance with the parameter information.

In a possible embodiment of the present disclosure, the repetition times of the preamble sequence are in reverse proportion to a length of the preamble sequence, and in direct proportion to a frequency offset proportion of the random access channel.

In another aspect, the present disclosure provides in some embodiments a method for configuring a random access channel for a network device, including: configuring parameter information and time-frequency resource allocation information corresponding to at least two types of random access channels; and notifying the parameter information and the time-frequency resource allocation information corresponding to the at least two types of random access channels to an access device. The parameter information corresponding to each type of random access channel includes a subcarrier spacing and a preamble sequence, a random access channel bandwidth obtained in accordance with the subcarrier spacing and a length of the preamble sequence is smaller than or equal to a maximum transmission bandwidth of a satellite access device, and the subcarrier spacing includes a reference value of a maximum frequency offset to be resisted by a satellite system.

In a possible embodiment of the present disclosure, the preamble sequences in the parameter information corresponding to different random access channels have different lengths, and/or the subcarrier spacings in the parameter information corresponding to different random access channels are different.

In a possible embodiment of the present disclosure, the parameter information corresponding to each type of random access channel further includes repetition times of the preamble sequence of the random access channel, and the repetition times of the preamble sequence of the random access channel are associated with the length of the preamble sequence and a frequency offset proportion of the random access channel.

In a possible embodiment of the present disclosure, the repetition times of the preamble sequence are in reverse proportion to a length of the preamble sequence, and in direct proportion to a frequency offset proportion of the random access channel.

In a possible embodiment of the present disclosure, the maximum transmission bandwidth of the satellite access device includes a bandwidth defined by a ground communications system and a bandwidth supported by the satellite system.

In yet another aspect, the present disclosure provides in some embodiments an access device, including a transceiver, a memory, a processor, and a program stored in the memory and capable of being executed by the processor. The processor is configured to execute the program to: obtain parameter information and time-frequency resource allocation information corresponding to at least two types of random access channels, the parameter information corresponding to each type of random access channel including a subcarrier spacing and a preamble sequence, a random access channel bandwidth obtained in accordance with the subcarrier spacing and a length of the preamble sequence being smaller than or equal to a maximum transmission bandwidth of a satellite access device, the subcarrier spacing including a reference value of a maximum frequency offset to be resisted by a satellite system; select target parameter information from the parameter information in accordance with a capability of the access device, an operating scenario of the access device and a frequency offset proportion of the random access channel; and select a random access channel in accordance with the target parameter information, and transmit a random access signal in accordance with the time-frequency resource allocation information.

In a possible embodiment of the present disclosure, when selecting the target parameter information from the parameter information in accordance with the capability of the access device, the operating scenario of the access device and the frequency offset proportion of the random access channel, the processor is further configured to execute the program, so as to: select a target random access channel bandwidth smaller than or equal to a maximum transmission bandwidth of the access device from the parameter information in accordance with the capability of the access device; select from the parameter information a target subcarrier spacing greater than the maximum frequency offset to be resisted by the access device in accordance with the operating scenario of the access device; and select a target preamble sequence from the parameter information in accordance with the frequency offset proportion of the random access channel.

In a possible embodiment of the present disclosure, when selecting the target preamble sequence from the parameter information in accordance with the frequency offset proportion of the random access channel, the processor is further configured to execute the program to: in the case that there is a plurality of same preamble sequences in the parameter information, select preamble sequences with a minimum frequency offset proportion from the plurality of same preamble sequences to obtain a target preamble sequence set; in the case that the target preamble sequence set includes different preamble sequences, determine the target preamble sequence in accordance with a frequency offset proportion of a random access channel corresponding to a shortest preamble sequence in the target preamble sequence set; and in the case that the target preamble sequence set does not include different preamble sequences, determine the preamble sequence in the target preamble sequence set as the target preamble sequence.

In a possible embodiment of the present disclosure, when determining the target preamble sequence in accordance with the frequency offset proportion of the random access channel corresponding to the shortest preamble sequence in the target preamble sequence set, the processor is further configured to execute the program to: in the case that the frequency offset proportion of the random access channel corresponding to the shortest preamble sequence in the target preamble sequence set is smaller than or equal to a first predetermined threshold, select the shortest preamble sequence as the target preamble sequence; in the case that the frequency offset proportion of the random access channel corresponding to the shortest preamble sequence in the target preamble sequence set is greater than or equal to a second predetermined threshold, select a longest preamble sequence as the target preamble sequence; and in the case that the frequency offset proportion of the random access channel corresponding to the shortest preamble sequence in the target preamble sequence set is greater than the first predetermined threshold and smaller than the second predetermined threshold, select a preamble sequence corresponding to a minimum random access channel bandwidth as the target preamble sequence, the second predetermined threshold being greater than the first predetermined threshold.

In a possible embodiment of the present disclosure, the parameter information corresponding to each type of random access channel further includes repetition times of the preamble sequence of the random access channel. Subsequent to obtaining the parameter information corresponding to the at least two types of random access channels, the processor is further configured to execute the program to determine the repetition times of the preamble sequence of the random access channel in accordance with the parameter information.

In a possible embodiment of the present disclosure, the repetition times of the preamble sequence are in reverse proportion to a length of the preamble sequence, and in direct proportion to a frequency offset proportion of the random access channel.

In still yet another aspect, the present disclosure provides in some embodiments a computer-readable storage medium storing therein a computer program. The computer program is configured to be executed by a processor to implement the steps of the above-mentioned method for selecting the random access channel.

In still yet another aspect, the present disclosure provides in some embodiments a network device, including a transceiver, a memory, a processor, and a program stored in the memory and capable of being executed by the processor. The processor is configured to execute the program to: configure parameter information and time-frequency resource allocation information corresponding to at least two types of random access channels; and notify the parameter information and the time-frequency resource allocation information corresponding to the at least two types of random access channels to an access device. The parameter information corresponding to each type of random access channel includes a subcarrier spacing and a preamble sequence, a random access channel bandwidth obtained in accordance with the subcarrier spacing and a length of the preamble sequence is smaller than or equal to a maximum transmission bandwidth of a satellite access device, and the subcarrier spacing includes a reference value of a maximum frequency offset to be resisted by a satellite system.

In a possible embodiment of the present disclosure, the preamble sequences in the parameter information corresponding to different random access channels have different lengths, and/or the subcarrier spacings in the parameter information corresponding to different random access channels are different.

In a possible embodiment of the present disclosure, the parameter information corresponding to each type of random access channel further includes repetition times of the preamble sequence of the random access channel, and the repetition times of the preamble sequence of the random access channel are associated with the length of the preamble sequence and a frequency offset proportion of the random access channel.

In a possible embodiment of the present disclosure, the repetition times of the preamble sequence are in reverse proportion to a length of the preamble sequence, and in direct proportion to a frequency offset proportion of the random access channel.

In a possible embodiment of the present disclosure, the maximum transmission bandwidth of the satellite access device includes a bandwidth defined by a ground communications system and a bandwidth supported by the satellite system.

In still yet another aspect, the present disclosure provides in some embodiments a computer-readable storage medium storing therein a computer program. The computer program is executed by a processor, so as to implement the steps of the above-mentioned method for configuring the random access channel.

In still yet another aspect, the present disclosure provides in some embodiments an access device, including: a first obtaining module configured to obtain parameter information and time-frequency resource allocation information corresponding to at least two types of random access channels, the parameter information corresponding to each type of random access channel including a subcarrier spacing and a preamble sequence, a random access channel bandwidth obtained in accordance with the subcarrier spacing and a length of the preamble sequence being smaller than or equal to a maximum transmission bandwidth of a satellite access device, the subcarrier spacing including a reference value of a maximum frequency offset to be resisted by a satellite system; a first selection module configured to select target parameter information from the parameter information in accordance with a capability of the access device, an operating scenario of the access device and a frequency offset proportion of the random access channel; and a second selection module configured to select a random access channel in accordance with the target parameter information, and transmit a random access signal in accordance with the time-frequency resource allocation information.

In a possible embodiment of the present disclosure, the first selection module includes: a first selection sub-module configured to select a target random access channel bandwidth smaller than or equal to a maximum transmission bandwidth of the access device from the parameter information in accordance with the capability of the access device; a second selection sub-module configured to select from the parameter information a target subcarrier spacing greater than the maximum frequency offset to be resisted by the access device in accordance with the operating scenario of the access device; and a third selection sub-module configured to select a target preamble sequence from the parameter information in accordance with the frequency offset proportion of the random access channel.

In a possible embodiment of the present disclosure, the third selection sub-module includes: a selection unit configured to, in the case that there is a plurality of same preamble sequences in the parameter information, select preamble sequences with a minimum frequency offset proportion from the plurality of same preamble sequences to obtain a target preamble sequence set; a first determination unit configured to, in the case that the target preamble sequence set includes different preamble sequences, determine the target preamble sequence in accordance with a frequency offset proportion of a random access channel corresponding to a shortest preamble sequence in the target preamble sequence set; and a second determination unit configured to, in the case that the target preamble sequence set does not include different preamble sequences, determine the preamble sequence in the target preamble sequence set as the target preamble sequence.

In a possible embodiment of the present disclosure, the first determination unit includes: a first selection sub-unit configured to, in the case that the frequency offset proportion of the random access channel corresponding to the shortest preamble sequence in the target preamble sequence set is smaller than or equal to a first predetermined threshold, select the shortest preamble sequence as the target preamble sequence; a second selection sub-unit configured to, in the case that the frequency offset proportion of the random access channel corresponding to the shortest preamble sequence in the target preamble sequence set is greater than or equal to a second predetermined threshold, select a longest preamble sequence as the target preamble sequence; and a third selection sub-unit configured to, in the case that the frequency offset proportion of the random access channel corresponding to the shortest preamble sequence in the target preamble sequence set is greater than the first predetermined threshold and smaller than the second predetermined threshold, select a preamble sequence corresponding to a minimum random access channel bandwidth as the target preamble sequence, the second predetermined threshold being greater than the first predetermined threshold.

In a possible embodiment of the present disclosure, the parameter information corresponding to each type of random access channel further includes repetition times of the preamble sequence of the random access channel. The access device further includes a determination module configured to, subsequent to obtaining the parameter information corresponding to the at least two types of random access channels, determine the repetition times of the preamble sequence of the random access channel in accordance with the parameter information.

In still yet another aspect, the present disclosure provides in some embodiments a network device, including: a configuration module configured to configure parameter information and time-frequency resource allocation information corresponding to at least two types of random access channels; and a notification module configured to notify the parameter information and the time-frequency resource allocation information corresponding to the at least two types of random access channels to an access device. The parameter information corresponding to each type of random access channel includes a subcarrier spacing and a preamble sequence, a random access channel bandwidth obtained in accordance with the subcarrier spacing and a length of the preamble sequence is smaller than or equal to a maximum transmission bandwidth of a satellite access device, and the subcarrier spacing includes a reference value of a maximum frequency offset to be resisted by a satellite system.

In a possible embodiment of the present disclosure, the preamble sequences in the parameter information corresponding to different random access channels have different lengths, and/or the subcarrier spacings in the parameter information corresponding to different random access channels are different.

In a possible embodiment of the present disclosure, the parameter information corresponding to each type of random access channel further includes repetition times of the preamble sequence of the random access channel, and the repetition times of the preamble sequence of the random access channel are associated with the length of the preamble sequence and a frequency offset proportion of the random access channel.

The present disclosure has the following beneficial effects.

According to the embodiments of the present disclosure, the parameter information and the time-frequency resource allocation information corresponding to the at least two types of random access channels are obtained, the target parameter information is selected from the parameter information in accordance with the capability of the access device, the operating scenario of the access device and the frequency offset proportion of the random access channel, the random access channel is selected in accordance with the target parameter information, and then the random access signal is transmitted in accordance with the time-frequency resource allocation information. Through the parameter information, it is able for the random access channel bandwidth to match a power level of the satellite access device, so as to meet a requirement on a signal-to-noise ratio for the system. In addition, a parameter of the random access channel is selected in such a manner as to approximate to that for a ground 5G system, so it is able for a satellite mobile communication system to make full use of an industrial advantages of the ground 5G system for development.

DETAILED DESCRIPTION

The present disclosure will be described hereinafter in conjunction with the drawings and embodiments. The following embodiments are for illustrative purposes only, but shall not be used to limit the scope of the present disclosure. Actually, the embodiments are provided so as to facilitate the understanding of the scope of the present disclosure.

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. The expression "and/or" involved in the embodiments of the present disclosure may represent at least one of listed items.

The following description is given for illustrative purposes but shall not be construed as limiting the scope, applicability or configuration set forth in the appended claims. Any alterations may be made on functions and arrangements of the discussed elements without departing from the spirit and scope of the present disclosure. Various procedures or assemblies may be omitted, replaced or added appropriately in the examples. For example, steps of the described method may be performed in an order different from that described in the context, and some steps may be added, omitted or combined. In addition, the features described with reference to some examples may be combined in the other examples.

Figure 1:
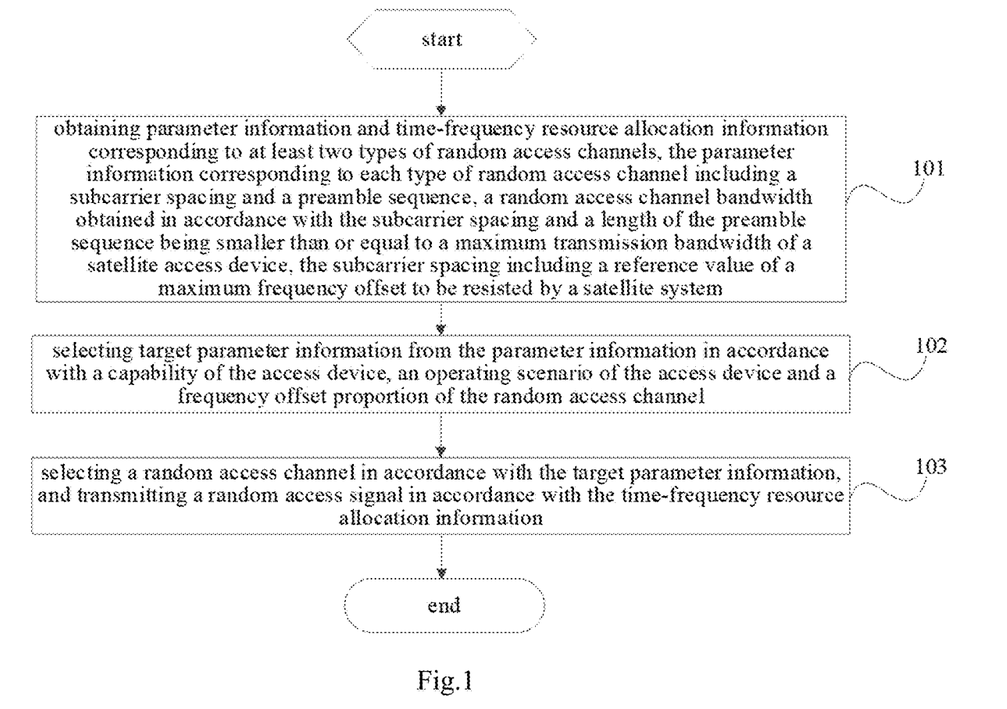
FIG. 1 is a flow chart of a method for selecting a random access channel according to an embodiment of the present disclosure.

As shown in FIG. 1, the present disclosure provides in some embodiments a method for selecting a random access channel for an access device. The access device may be specifically a User Equipment (UE) or terminal, a base station, or a relay node. The method includes the following steps.

Step 101: obtaining parameter information and time-frequency resource allocation information corresponding to at least two types of random access channels. The parameter information corresponding to each type of random access channel includes a subcarrier spacing and a preamble sequence, a random access channel bandwidth obtained in accordance with the subcarrier spacing and a length of the preamble sequence is smaller than or equal to a maximum transmission bandwidth of a satellite access device, and the subcarrier spacing includes a reference value of a maximum frequency offset to be resisted by a satellite system.

In the embodiments of the present disclosure, the random access channel bandwidth is obtained in accordance with a product of the length of the preamble sequence and the subcarrier spacing. The maximum transmission bandwidth of the satellite access device includes a bandwidth defined by a ground communication system and a bandwidth supported by the satellite system.

The ground communication system may be specifically a ground 5G communication system. The bandwidths defined by the ground 5G communication system include 400 MHz, 200 MHz, 100 MHz and 50 MHz. The bandwidths supported by the satellite system include narrows bands, i.e., 2 MHz and 5*nMHz (n<10), and a broadband, i.e., 50*nMHz (n≤8).

The preamble sequences in the parameter information corresponding to different random access channels have different lengths, and/or the subcarrier spacings in the parameter information corresponding to different random access channels are different.

In the embodiments of the present disclosure, apart from the reference value of the maximum frequency offset to be resisted by the satellite system, the subcarrier spacing of the random access channel further includes a reference value defined by the ground communication system.

The reference values defined by the ground communication system are specifically reference values defined by the ground 5G communication system, e.g., 1.25 KHz, 5 KHz, 15 KHz, 30 KHz, 60 KHz and 120 KHz. For the reference value of the maximum frequency offset to be resisted by the satellite system, apart from the reference value defined by the ground 5G communication system, a larger frequency offset, e.g., 240 KHz or 480 KHz, may be taken into consideration, or a refined value may be selected within an existing frequency offset range, e.g., within a range from 1 KHz to 30 KHz.

In the embodiments of the present disclosure, the structure of the random access channel is a preamble sequence with a Cyclic Prefix (CP) and predetermined repetition times.

The preamble sequence is defined on the basis of a Zadoff Chu (ZC) sequence or an m sequence, and typically the preamble sequence has a length of 839 or 139.

The repetition times of the preamble sequence are associated with the length of the preamble sequence and a frequency offset proportion of the random access channel. To be specific, the repetition times of the preamble sequence are in reverse proportion to a length of the preamble sequence, and in direct proportion to a frequency offset proportion of the random access channel. In other words, the longer the preamble, the fewer the repetition times of the preamble; the shorter the preamble, the more the repetition times of the preamble; the smaller the frequency offset proportion of the random access channel, the fewer the repetition times of the preamble; and the larger the frequency offset proportion of the random access channel, the more the repetition times of the preamble. The frequency offset proportion of the random access channel=the maximum frequency offset to be resisted by the system/the subcarrier spacing.

Step 102: selecting target parameter information from the parameter information in accordance with a capability of the access device, an operating scenario of the access device and the frequency offset proportion of the random access channel.

Here, the capability of the access device includes a maximum transmission bandwidth of the access device, and the operating scenario of the access device specifically includes an aircraft-mounted terminal, a ship-mounted terminal, a train-mounted terminal, a vehicle-mounted terminal, etc.

The target parameter information includes a target random access channel bandwidth, a target subcarrier spacing and a target preamble sequence.

Step 103: selecting a random access channel in accordance with the target parameter information, and transmitting a random access signal in accordance with the time-frequency resource allocation information.

Here, subsequent to determining the target parameter information, a corresponding random access channel is selected in accordance with the target parameter information.

According to the method for selecting the random access channel in the embodiments of the present disclosure, the parameter information and the time-frequency resource allocation information corresponding to the at least two types of random access channels are obtained, the target parameter information is selected from the parameter information in accordance with the capability of the access device, the operating scenario of the access device and the frequency offset proportion of the random access channel, the random access channel is selected in accordance with the target parameter information, and then the random access signal is transmitted in accordance with the time-frequency resource allocation information. Through the parameter information, it is able for the random access channel bandwidth to match a power level of the satellite access device, so as to meet a requirement on a signal-to-noise ratio for the system. In addition, a parameter of the random access channel is selected in such a manner as to approximate to that for a ground 5G system, so it is able for a satellite mobile communication system to make full use of an industrial advantages of the ground 5G system for development.

In a possible embodiment of the present disclosure, the selecting the target parameter information from the parameter information in accordance with the capability of the access device, the operating scenario of the access device and the frequency offset proportion of the random access channel includes: selecting a target random access channel bandwidth smaller than or equal to a maximum transmission bandwidth of the access device from the parameter information in accordance with the capability of the access device; selecting from the parameter information a target subcarrier spacing greater than the maximum frequency offset to be resisted by the access device in accordance with the operating scenario of the access device; and selecting a target preamble sequence from the parameter information in accordance with the frequency offset proportion of the random access channel.

Further, the selecting the target preamble sequence from the parameter information in accordance with the frequency offset proportion of the random access channel includes: in the case that there is a plurality of same preamble sequences in the parameter information, selecting preamble sequences with a minimum frequency offset proportion from the plurality of same preamble sequences to obtain a target preamble sequence set; in the case that the target preamble sequence set includes different preamble sequences, determining the target preamble sequence in accordance with a frequency offset proportion of a random access channel corresponding to a shortest preamble sequence in the target preamble sequence set; and in the case that the target preamble sequence set does not include different preamble sequences, determining the preamble sequence in the target preamble sequence set as the target preamble sequence.

Further, the determining the target preamble sequence in accordance with the frequency offset proportion of the random access channel corresponding to the shortest preamble sequence in the target preamble sequence set includes: in the case that the frequency offset proportion of the random access channel corresponding to the shortest preamble sequence in the target preamble sequence set is smaller than or equal to a first predetermined threshold, selecting the shortest preamble sequence as the target preamble sequence; in the case that the frequency offset proportion of the random access channel corresponding to the shortest preamble sequence in the target preamble sequence set is greater than or equal to a second predetermined threshold, selecting a longest preamble sequence as the target preamble sequence; and in the case that the frequency offset proportion of the random access channel corresponding to the shortest preamble sequence in the target preamble sequence set is greater than the first predetermined threshold and smaller than the second predetermined threshold, selecting a preamble sequence corresponding to a minimum random access channel bandwidth as the target preamble sequence, the second predetermined threshold being greater than the first predetermined threshold.

For example, the first predetermined threshold is specifically 10%, and the second predetermined threshold is specifically 50%.

According to the method for selecting the random access channel in the embodiments of the present disclosure, the parameter information and the time-frequency resource allocation information corresponding to the at least two types of random access channels are obtained, the target parameter information is selected from the parameter information in accordance with the capability of the access device, the operating scenario of the access device and the frequency offset proportion of the random access channel, the random access channel is selected in accordance with the target parameter information, and then the random access signal is transmitted in accordance with the time-frequency resource allocation information. Through the parameter information, it is able for the random access channel bandwidth to match a power level of the satellite access device, so as to meet a requirement on a signal-to-noise ratio for the system. In addition, a parameter of the random access channel is selected in such a manner as to approximate to that for a ground 5G system, so it is able for a satellite mobile communication system to make full use of an industrial advantages of the ground 5G system for development.

Figure 2:
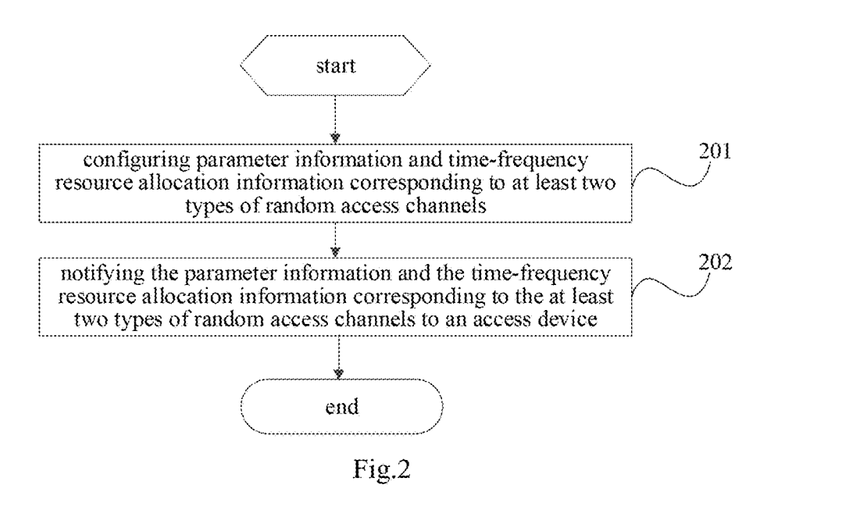
FIG. 2 is a flow chart of a method for configuring a random access channel according to an embodiment of the present disclosure.

As shown in FIG. 2, the present disclosure further provides in some embodiments a method for configuring a random access channel for a network device. The network device specifically includes a satellite, a ground base station or a gateway. The method includes: Step 201 of configuring parameter information and time-frequency resource allocation information corresponding to at least two types of random access channels; and Step 202 of notifying the parameter information and the time-frequency resource allocation information corresponding to the at least two types of random access channels to an access device. The parameter information corresponding to each type of random access channel includes a subcarrier spacing and a preamble sequence, a random access channel bandwidth obtained in accordance with the subcarrier spacing and a length of the preamble sequence is smaller than or equal to a maximum transmission bandwidth of a satellite access device, and the subcarrier spacing includes a reference value of a maximum frequency offset to be resisted by a satellite system.

The preamble sequences in the parameter information corresponding to different random access channels have different lengths, and/or the subcarrier spacings in the parameter information corresponding to different random access channels are different.

In the embodiments of the present disclosure, the random access channel bandwidth is obtained in accordance with a product of the length of the preamble sequence and the subcarrier spacing. The maximum transmission bandwidth of the satellite access device includes a bandwidth defined by a ground communication system and a bandwidth supported by the satellite system.

The ground communication system may be specifically a ground 5G communication system. The bandwidths defined by the ground 5G communication system include 400 MHz, 200 MHz, 100 MHz and 50 MHz. The bandwidths supported by the satellite system include narrows bands, i.e., 2 MHz and 5*nMHz (n<10), and a broadband, i.e., 50*nMHz (n≤8).

In the embodiments of the present disclosure, apart from the reference value of the maximum frequency offset to be resisted by the satellite system, the subcarrier spacing of the random access channel further includes a reference value defined by the ground communication system.

The reference values defined by the ground communication system are specifically reference values defined by the ground 5G communication system, e.g., 1.25 KHz, 5 KHz, 15 KHz, 30 KHz, 60 KHz and 120 KHz. For the reference value of the maximum frequency offset to be resisted by the satellite system, apart from the reference value defined by the ground 5G communication system, a larger frequency offset, e.g., 240 KHz or 480 KHz, may be taken into consideration, or a refined value may be selected within an existing frequency offset range, e.g., within a range from 1 KHz to 30 KHz.

The parameter information corresponding to each type of random access channel further includes repetition times of the preamble sequence of the random access channel, and the repetition times of the preamble sequence of the random access channel are associated with the length of the preamble sequence and a frequency offset proportion of the random access channel.

To be specific, the repetition times of the preamble sequence are in reverse proportion to a length of the preamble sequence, and in direct proportion to a frequency offset proportion of the random access channel.

Further, the maximum transmission bandwidth of the satellite access device includes a bandwidth defined by a ground communications system and a bandwidth supported by the satellite system.

According to the method for configuring the random access channel in the embodiments of the present disclosure, the parameter information and the time-frequency resource allocation information corresponding to the at least two types of random access channels are configured, and then the parameter information and the time-frequency resource allocation information corresponding to the at least two types of random access channels are notified to the access device. Through the parameter information, it is able for the random access channel bandwidth to match a power level of the satellite access device, so as to meet a requirement on a signal-to-noise ratio for the system. In addition, a parameter of the random access channel is selected in such a manner as to approximate to that for a ground 5G system, so it is able for a satellite mobile communication system to make full use of an industrial advantages of the ground 5G system for development.

The present disclosure will be described hereinafter in more details in conjunction with the embodiments.

When the access device is a terminal, two carrier types, i.e., a carrier within a frequency range FR1 (<6 GHz) and a carrier within a frequency range FR2 (>6 GHz), are defined by the ground 5G system. For a traffic channel, a bandwidth of a single carrier within the range FR1 is defined as an integral multiple of 20 MHz, with a maximum value of 100 MHz and principally including three subcarrier spacings, i.e., 15 KHz, 30 KHz and 60 KHz. A bandwidth of a single carrier within the range FR2 is defined as an integral multiple of 50 MHz, with a maximum value of 400 MHz and principally including a subcarrier spacing of 120 KHz or more. For a random access channel, as shown in FIG. 2, its basic form consists of one CP and a preamble sequence (preamble) repeated for multiple times. A length of the preamble and a subcarrier spacing within the range FR1 principally include 839*1.25 KHz, 839*5 KHz, 139*15 KHz or 139*30 KHz, and a length of the preamble and a subcarrier spacing within the range FR2 principally include 139*60 KHz or 139*120 KHz. Hence, a bandwidth of a random access channel within the range FR1 is 1.05 MHz to 4.17 MHz, which is smaller than a minimum single-carrier bandwidth, i.e., 20 MHz, and it means that the random access channel width is not limited. Identically, a bandwidth of a random access channel within the range FR2 is 8.34 MHz to 16.68 MHz, which is smaller than a minimum single-carrier bandwidth, i.e., 50 MHz, and it means that the random access channel width is not limited either.

When the access device is a terminal, for the satellite communication system, the cost of the terminal is associated with its maximum transmission power, and the terminal with low cost has smaller maximum transmission power. Because the power and the bandwidth are resources of the system, small transmission power corresponds to small transmission bandwidth. Taking a Little Earth Orbit (LEO) system at a Ka frequency band as an example, with reference to a bandwidth design of the ground 5G system, although the single-carrier bandwidth for the satellite is defined as 400 MHz, a terminal with a small aperture has low Effective Isotropic Radiated Power (EIRP). When a large bandwidth is adopted for transmission, inevitably a signal-to-noise ratio of a receiver is very low, and it is difficult to demodulate a signal. Hence, usually an actual maximum bandwidth of the terminal for transmission is associated with a maximum EIRP value. Table 2 shows an instance of a transmission capability of the terminal. As shown in Table 2, a terminal with an aperture of 1 m is capable of satisfying the minimum transmission bandwidth of 50 MHz defined in the ground 5G system, and each of the other three terminals with different apertures has a maximum transmission bandwidth smaller than that defined in the ground 5G system and thereby probably does not satisfy the requirement on the bandwidth of the random access channel. For example, the terminal with an aperture of 0.45 m has a maximum transmission bandwidth of 15 MHz, which is smaller than a bandwidth of a random access channel using a 139*120 KHz preamble sequence, i.e., 16.68 MHz; and the terminal with an aperture of 0.3 m has a maximum transmission bandwidth of 5 MHz, which is smaller than a bandwidth of a random access channel using a 139*60 KHz preamble sequence, i.e., 8.34 MHz. The maximum transmission bandwidth supported by the terminal is smaller than the random access channel width, so it is necessary to re-design the random access channel, including the length of the preamble sequence, the subcarrier spacing, the repetition times, etc.

TABLE 2

| Maximum EIRP of terminal | 46 dBW | 41 dBW | 36.5 dBW | 31.5 dBW |
|---|---|---|---|---|
| Maximum transmission bandwidth | 100 MHz | 35 MHz | 15 MHz | 5 MHz |
| Terminal type | Aperture of 1 m | Aperture of 0.75 m | Aperture of 0.45 m | Aperture of 0.3 m |
| Application scenario | Aircraft-mounted (e.g., civil aviation) | Ship-mounted (e.g., luxury cruise) | train-mounted | vehicle-mounted |

The design of the preamble sequence is associated with various factors such as frequency offset resistance, the quantity of concurrent users and system overhead. Usually, when the frequency offset is larger, it means that the preamble sequence needs to be provided with a larger subcarrier spacing; when the quantity of the concurrent users is larger, it means that the preamble sequence needs to be provided with better anti-Multiple Access Interference (MAI) capability and with a larger length; and when the system overhead is larger, it means that a larger time-frequency resource for random access is available and the preamble is capable of being repeated in more times. Hence, during the design of the preamble sequence, these factors need to be taken into consideration. On the basis of a detection test, usually a maximum tolerance of the system to the frequency offset is once of the subcarrier spacing, so the subcarrier spacing of the preamble sequence may be taken into consideration preferentially.

Without loss of generality, taking a high-frequency LEO satellite mobile communication system designed with reference to the ground 5G system as an example, its random access channel is designed as follows.

A maximum bandwidth supported by the random access channel is defined. Usually, a designed bandwidth of the random access channel is smaller than or equal to a maximum bandwidth of a traffic channel, i.e., BWRACH≤BWdata. For a terminal with a large aperture, the bandwidth of the traffic channel is obviously larger than the bandwidth of the random access channel, so the bandwidth of the random access channel may be set with reference to the ground 5G system. For a terminal with a small aperture, in order to make full use of the transmission power or achieve a balance between the bandwidth of the traffic channel and the bandwidth of the access channel as possible, the designed bandwidth of the random access channel may be directly defined as the maximum bandwidth of the traffic channel. With respect to Table 2, the bandwidths of the random access channels for various terminals are shown in Table 3.

TABLE 3

| Terminal type | Aircraft-mounted | Ship-mounted | Train-mounted | Vehicle-mounted |
| --- | --- | --- | --- | --- |
| Bandwidth of traffic channel | 100 MHz | 35 MHz | 15 MHz | 5 MHz |
| Designed bandwidth of random access channel | 16.34 MHz | 16.34 MHz | 15 MHz | 5 MHz |

The Subcarrier Spacing (SCS) of the random access channel is defined. Usually, the subcarrier spacing SCS should be smaller than or equal to the maximum frequency offset to be resisted, i.e., SCS≤Δf. In a random access process, the maximum frequency offset to be resisted usually at least includes two parts, one from a residual frequency offset generated after the frequency offset caused by the movement of the satellite has been suppressed by the system, and the other from the movement of the terminal itself. With respect to Table 2, frequency offset estimates and the subcarrier spacings for various terminals are shown in Table 4.

TABLE 4

| Terminal type | Aircraft-mounted | Ship-mounted | Train-mounted | Vehicle-mounted |
| --- | --- | --- | --- | --- |
| Speed | 1000 km/h | 60 km/h | 300 km/h | 120 km/h |
| Frequency offset caused by movement of terminal | 27.8 KHz | 1.7 KHz | 8.3 KHz | 3.3 KHz |
| Residual frequency offset of system | 1 KHz | 1 KHz | 1 KHz | 1 KHz |
| Maximum frequency offset to be resisted | ≈30 KHz | ≈3 KHz | ≈10 KHz | ≈5 KHz |
| SCS | 30 KHz | 3 KHz | 10 KHz | 5 KHz |

The preamble is designed. A maximum length of the preamble may be determined in accordance with the random access channel bandwidth and the SCS, and then the preamble sequence is selected with reference to codes defined in the ground 5G system (which are generated using a Zadoff-Chu sequence and have two lengths, i.e., 839 and 139), so that the length of the selected preamble sequence is smaller than or equal to a maximum code length. With respect to Table 2, the preambles for various terminals are shown in Table 5.

TABLE 5

| Terminal type | Aircraft-mounted | Ship-mounted | Train-mounted | Vehicle-mounted |
| --- | --- | --- | --- | --- |
| Designed bandwidth of random access channel | 16.34 MHz | 16.34 MHz | 15 MHz | 5 MHz |
| SCS | 30 KHz | 3 KHz | 10 KHz | 5 KHz |
| Maximum code length | 544 | 5440 | 1500 | 1000 |
| Code selection with reference to Ground 5G system | ZC sequence having a length of 139 | ZC sequence having a length of 839 | ZC sequence having a length of 839 | ZC sequence having a length of 839 |

The SCS is adjusted and the transmission times of the preamble are defined. Considering that the system's resistance to frequency offset is stronger in the case of a larger redundancy level of the SCS relative to the frequency offset, the SCS of the selected preamble may be further adjusted, e.g., the SCS may be increased as possible, or the SCS defined in the ground 5G system may be selected as possible, as long as the adjusted bandwidth is smaller than the designed random access channel bandwidth. In addition, the appropriate transmission times of the preamble may be designed in accordance with an anti-frequency offset percentage of the preamble, on the basis of such a principle as to ensure the detection performance of a receiver and reduce the system overhead as possible. Usually, the Zadoff-Chu sequence having a length of 139 needs to be repeated for more than four times so as to resist 50% or more of the frequency offset, and the Zadoff-Chu sequence having a length of 839 does not need to be repeated to resist 90% of the frequency offset. With respect to Tables 3 to 5, parameters of the random access channel for various terminals are shown in Table 6.

TABLE 6

| Terminal type | Aircraft-mounted | Ship-mounted | Train-mounted | Vehicle-mounted |
| --- | --- | --- | --- | --- |
| Bandwidth of traffic channel | 100 MHz | 35 MHz | 15 MHz | 5 MHz |
| Actual bandwidth of random access channel | 16.34 MHz | 12.58 MHz | 12.58 MHz | 4.2 MHz |
| Preamble | ZC sequence having a length of 139 | ZC sequence having a length of 839 | ZC sequence having a length of 839 | ZC sequence having a length of 839 |
| SCS of preamble | 120 KHz | 15 KHz | 15 KHz | 5 KHz |
| Anti-frequency offset percentage | 25% | 20% | 67% | 100% |
| Transmission times of preamble | Twice to four times | Once | Once | Once to four times |

Based on the above design ideas, it is able to design a summary sheet of the parameters of the random access channel conforming to the ground 5G system and satisfying the specific requirements on the high-frequency LEO satellite mobile communication system. Table 7 shows an example. Table 7 includes the preamble sequences having different lengths, and each preamble sequence includes the SCSs at different granularity levels. This table includes typical formats defined in the ground 5G system, and new typical formats in the satellite mobile communication system. Hence, the random access channel on the basis of this table may reflect access requirements for various terminals in the satellite mobile communication system.

TABLE 7

| Format | Preamble sequence length | SCS | Random access channel bandwidth |
|---|---|---|---|
| 1 | 139 | 15 KHz | 2.04 MHz |
| 2 | 139 | 30 KHz | 4.09 MHz |
| 3 | 139 | 60 KHz | 8.17 MHz |
| 4 | 139 | 120 KHz | 16.34 MHz |
| 5 | 839 | 1.25 KHz | 1.05 MHz |
| 6 | 839 | 5 KHz | 4.2 MHz |
| 7 | 839 | 7.5 KHz | 6.29 MHz |
| 8 | 839 | 10 KHz | 8.39 MHz |
| 9 | 839 | 12.5 KHz | 10.5 MHz |
| 10 | 839 | 15 KHz | 12.59 MHz |
| 11 | 839 | 20 KHz | 16.78 MHz |
| 12 | 839 | 25 KHz | 20.88 MHz |
| 13 | 839 | 30 KHz | 25.18 MHz |

The designed parameters of the random access channel in the table may be used as agreed parameters of the system, so that the terminal selects an appropriate format for access. Without loss of generality, taking the above-mentioned high-frequency LEO satellite mobile communication system as an example, the terminal may select the parameters of the random access channel as follows.

The bandwidth of the random access channel is selected. The random access channel bandwidth to be supported needs to be smaller than or equal to the maximum transmission bandwidth of the traffic channel. With respect to Table 2, potential formats of the random access channel for various terminals are shown in Table 8.

TABLE 8

| Terminal type | Aperture of 1 m | Aperture of 0.75 m | Aperture of 0.45 m | Aperture of 0.3 m |
|---|---|---|---|---|
| Bandwidth of traffic channel | 100 MHz | 35 MHz | 15 MHz | 5 MHz |
| Potential format of random access channel | Formats 1 to 13 | Formats 1 to 13 | Formats 1 to 3 and 5 to 10 | Formats 1, 2, 5 and 6 |

The SCS of the random access channel is selected. The SCS to be supported needs to be greater than the maximum frequency offset to be resisted. With respect to Table 2, on the basis of Table 8, the potential formats of the random access channel for various terminals are shown in Table 9.

TABLE 9

| Terminal type | Aperture of 1 m | Aperture of 0.75 m | Aperture of 0.45 m | Aperture of 0.3 m |
|---|---|---|---|---|
| Maximum frequency offset to be resisted | ≈30 KHz | ≈3 KHz | ≈10 KHz | ≈5 KHz |
| Potential formats of random access channel | Formats 2 to 4 and 13 | Formats 1 to 4 and 6 to 13 | Formats 1 to 3 and 8 to 10 | Formats 1, 2 and 6 |

A unique value of a same root sequence of the random access channel is selected. When there is a plurality of same root sequence formats, a format with a minimum frequency offset proportion is selected with respect to the root sequences. With respect to Table 2, on the basis of Table 9, the potential formats of the random access channel for various terminals are shown in Table 10.

TABLE 10

| Terminal type | Aperture of 1 m | Aperture of 0.75 m | Aperture of 0.45 m | Aperture of 0.3 m |
|---|---|---|---|---|
| Potential formats of random access channel | Format 4: frequency offset proportion 25% | Format 4: frequency offset proportion 2.5% | Format 3: frequency offset proportion 16.7% | Format 2: frequency offset proportion 16.7% |
| | Format 13: frequency offset proportion 100% | Format 13: frequency offset proportion 10% | Format 10: frequency offset proportion 67% | Format 6: frequency offset proportion 100% |

Unique values of different root sequences of the random access channel are selected. When there are different root sequence formats, further judgment is performed in accordance with a frequency offset proportion of a shortest sequence (i.e., a sequence having a length of 139). When the frequency offset proportion≤10%, a format of the sequence having a length of 139 is selected; when the frequency offset proportion≥50%, a format of the sequence having a length of 839 is selected; when the frequency offset proportion is greater than 10% and smaller than 50%, a format with a minimum random access channel bandwidth is selected. With respect to Table 2, on the basis of Table 10, the formats of the random access channel finally selected by various terminals are shown in Table 11. As shown in Table 11, for the terminals with an aperture of 1 m and an aperture of 0.75 m, the format 4 may be selected as a parameter design of the random access channel; for the terminal with an aperture of 0.45 m, the format 3 may be selected as a parameter design of the random access channel; and for the terminal with an aperture of 0.3 m, the format 2 may be selected as a parameter design of the random access channel.

TABLE 11

| Terminal type | Aperture of 1 m | Aperture of 0.75 m | Aperture of 0.45 m | Aperture of 0.3 m |
|---|---|---|---|---|
| Bandwidth of traffic channel | 100 MHz | 35 MHz | 15 MHz | 5 MHz |
| Maximum frequency offset to be resisted | ≈30 KHz | ≈3 KHz | ≈10 KHz | ≈5 KHz |
| Selected random access channel | Format 4: 139*120 KHz = 16.34 MHz | Format 4: 139*120 KHz = 16.34 MHz | Format 3: 139*60 KHz = 8.17 MHz | Format 2: 139*30 KHz = 4.09 MHz |
| Frequency offset proportion | 25% | 2.5% | 16.7% | 16.7% |

According to the embodiments of the present disclosure, through designing the satellite mobile communication system in accordance with the ground 5G system, it is able for the designed random access channel bandwidth to match a power level of the terminal, so as to meet a requirement on a signal-to-noise ratio for the system. In addition, the parameter of the random access channel is selected in such a manner as to approximate to that for a ground 5G system, so it is able for a satellite mobile communication system to make full use of an industrial advantages of the ground 5G system for development.

Figure 3:
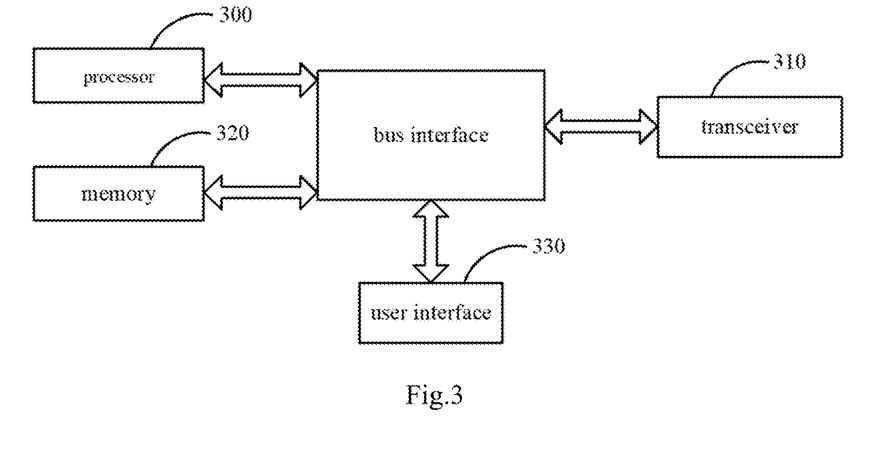
FIG. 3 is a block diagram of an access device according to an embodiment of the present disclosure.

As shown in FIG. 3, the present disclosure further provides in some embodiments an access device, which includes a transceiver, a memory, a processor, and a computer program stored in the memory and capable of being executed by the processor. The processor is configured to execute the computer program so as to: obtain parameter information and time-frequency resource allocation information corresponding to at least two types of random access channels, the parameter information corresponding to each type of random access channel including a subcarrier spacing and a preamble sequence, a random access channel bandwidth obtained in accordance with the subcarrier spacing and a length of the preamble sequence being smaller than or equal to a maximum transmission bandwidth of a satellite access device, the subcarrier spacing including a reference value of a maximum frequency offset to be resisted by a satellite system; select target parameter information from the parameter information in accordance with a capability of the access device, an operating scenario of the access device and a frequency offset proportion of the random access channel; and select a random access channel in accordance with the target parameter information, and transmit a random access signal in accordance with the time-frequency resource allocation information.

In FIG. 3, bus architecture includes a number of buses and bridges connected to each other, so as to connect various circuits for one or more processors 300 and one or more memories 320. In addition, as is known in the art, the bus architecture may be used to connect any other circuits, such as a circuit for a peripheral device, a circuit for a voltage stabilizer and a power management circuit. A bus interface is provided, and the transceiver 310 consists of a plurality of elements, i.e., a transmitter and a receiver for communication with any other devices over a transmission medium. With respect to different terminals, a user interface 330 is also provided for devices which are to be arranged inside or outside the terminal, and these devices may include but not limited to a keypad, a display, a speaker, a microphone and a joystick. The processor 300 takes charge of managing the bus architecture as well as general processings. The memory 320 stores therein data for the operation of the processor 300.

In a possible embodiment of the present disclosure, when selecting the target parameter information from the parameter information in accordance with the capability of the access device, the operating scenario of the access device and the frequency offset proportion of the random access channel, the processor 300 is further configured to execute the program, so as to: select a target random access channel bandwidth smaller than or equal to a maximum transmission bandwidth of the access device from the parameter information in accordance with the capability of the access device; select from the parameter information a target subcarrier spacing greater than the maximum frequency offset to be resisted by the access device in accordance with the operating scenario of the access device; and select a target preamble sequence from the parameter information in accordance with the frequency offset proportion of the random access channel.

In a possible embodiment of the present disclosure, when selecting the target preamble sequence from the parameter information in accordance with the frequency offset proportion of the random access channel, the processor 300 is further configured to execute the program to: in the case that there is a plurality of same preamble sequences in the parameter information, select preamble sequences with a minimum frequency offset proportion from the plurality of same preamble sequences to obtain a target preamble sequence set; in the case that the target preamble sequence set includes different preamble sequences, determine the target preamble sequence in accordance with a frequency offset proportion of a random access channel corresponding to a shortest preamble sequence in the target preamble sequence set; and in the case that the target preamble sequence set does not include different preamble sequences, determine the preamble sequence in the target preamble sequence set as the target preamble sequence.

In a possible embodiment of the present disclosure, when determining the target preamble sequence in accordance with the frequency offset proportion of the random access channel corresponding to the shortest preamble sequence in the target preamble sequence set, the processor 300 is further configured to execute the program to: in the case that the frequency offset proportion of the random access channel corresponding to the shortest preamble sequence in the target preamble sequence set is smaller than or equal to a first predetermined threshold, select the shortest preamble sequence as the target preamble sequence; in the case that the frequency offset proportion of the random access channel corresponding to the shortest preamble sequence in the target preamble sequence set is greater than or equal to a second predetermined threshold, select a longest preamble sequence as the target preamble sequence; and in the case that the frequency offset proportion of the random access channel corresponding to the shortest preamble sequence in the target preamble sequence set is greater than the first predetermined threshold and smaller than the second predetermined threshold, select a preamble sequence corresponding to a minimum random access channel bandwidth as the target preamble sequence, the second predetermined threshold being greater than the first predetermined threshold.

In a possible embodiment of the present disclosure, the parameter information corresponding to each type of random access channel further includes repetition times of the preamble sequence of the random access channel. Subsequent to obtaining the parameter information corresponding to the at least two types of random access channels, the processor 300 is further configured to execute the program to determine the repetition times of the preamble sequence of the random access channel in accordance with the parameter information.

In a possible embodiment of the present disclosure, the repetition times of the preamble sequence are in reverse proportion to a length of the preamble sequence, and in direct proportion to a frequency offset proportion of the random access channel.

The program is executed by the processor 300 so as to implement the above-mentioned method for selecting the random access channel at an access device side with a same technical effect, which will not be particularly defined herein.

The present disclosure further provides in some embodiments a computer-readable storage medium storing therein a computer program. The computer program is configured to be executed by a processor to: obtain parameter information and time-frequency resource allocation information corresponding to at least two types of random access channels, the parameter information corresponding to each type of random access channel including a subcarrier spacing and a preamble sequence, a random access channel bandwidth obtained in accordance with the subcarrier spacing and a length of the preamble sequence being smaller than or equal to a maximum transmission bandwidth of a satellite access device, the subcarrier spacing including a reference value of a maximum frequency offset to be resisted by a satellite system; select target parameter information from the parameter information in accordance with a capability of the access device, an operating scenario of the access device and a frequency offset proportion of the random access channel; and select a random access channel in accordance with the target parameter information, and transmit a random access signal in accordance with the time-frequency resource allocation information.

The program is executed by the processor so as to implement the above-mentioned method for selecting the random access channel at an access device side with a same technical effect, which will not be particularly defined herein.

Figure 4:
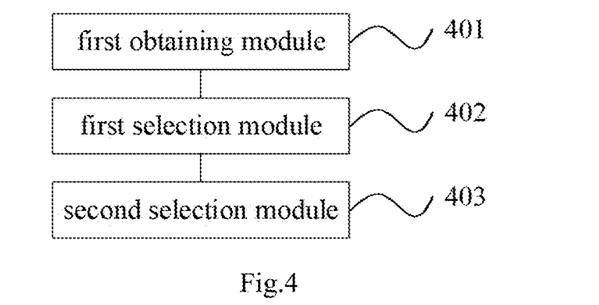
FIG. 4 is a schematic view showing modules of the access device according to an embodiment of the present disclosure.

As shown in FIG. 4, the present disclosure further provides in some embodiments an access device, which includes: a first obtaining module 401 configured to obtain parameter information and time-frequency resource allocation information corresponding to at least two types of random access channels, the parameter information corresponding to each type of random access channel including a subcarrier spacing and a preamble sequence, a random access channel bandwidth obtained in accordance with the subcarrier spacing and a length of the preamble sequence being smaller than or equal to a maximum transmission bandwidth of a satellite access device, the subcarrier spacing including a reference value of a maximum frequency offset to be resisted by a satellite system; a first election module 402 configured to select target parameter information from the parameter information in accordance with a capability of the access device, an operating scenario of the access device and a frequency offset proportion of the random access channel; and a second selection module 403 configured to select a random access channel in accordance with the target parameter information, and transmit a random access signal in accordance with the time-frequency resource allocation information.

In a possible embodiment of the present disclosure, the first selection module includes: a first selection sub-module configured to select a target random access channel bandwidth smaller than or equal to a maximum transmission bandwidth of the access device from the parameter information in accordance with the capability of the access device; a second selection sub-module configured to select from the parameter information a target subcarrier spacing greater than the maximum frequency offset to be resisted by the access device in accordance with the operating scenario of the access device; and a third selection sub-module configured to select a target preamble sequence from the parameter information in accordance with the frequency offset proportion of the random access channel.

In a possible embodiment of the present disclosure, the third selection sub-module includes: a selection unit configured to, in the case that there is a plurality of same preamble sequences in the parameter information, select preamble sequences with a minimum frequency offset proportion from the plurality of same preamble sequences to obtain a target preamble sequence set; a first determination unit configured to, in the case that the target preamble sequence set includes different preamble sequences, determine the target preamble sequence in accordance with a frequency offset proportion of a random access channel corresponding to a shortest preamble sequence in the target preamble sequence set; and a second determination unit configured to, in the case that the target preamble sequence set does not include different preamble sequences, determine the preamble sequence in the target preamble sequence set as the target preamble sequence.

In a possible embodiment of the present disclosure, the first determination unit includes: a first selection sub-unit configured to, in the case that the frequency offset proportion of the random access channel corresponding to the shortest preamble sequence in the target preamble sequence set is smaller than or equal to a first predetermined threshold, select the shortest preamble sequence as the target preamble sequence; a second selection sub-unit configured to, in the case that the frequency offset proportion of the random access channel corresponding to the shortest preamble sequence in the target preamble sequence set is greater than or equal to a second predetermined threshold, select a longest preamble sequence as the target preamble sequence; and a third selection sub-unit configured to, in the case that the frequency offset proportion of the random access channel corresponding to the shortest preamble sequence in the target preamble sequence set is greater than the first predetermined threshold and smaller than the second predetermined threshold, select a preamble sequence corresponding to a minimum random access channel bandwidth as the target preamble sequence, the second predetermined threshold being greater than the first predetermined threshold.

In a possible embodiment of the present disclosure, the parameter information corresponding to each type of random access channel further includes repetition times of the preamble sequence of the random access channel. The access device further includes a determination module configured to, subsequent to obtaining the parameter information corresponding to the at least two types of random access channels, determine the repetition times of the preamble sequence of the random access channel in accordance with the parameter information.

In a possible embodiment of the present disclosure, the repetition times of the preamble sequence are in reverse proportion to a length of the preamble sequence, and in direct proportion to a frequency offset proportion of the random access channel.

According to the access device in the embodiments of the present disclosure, the parameter information and the time-frequency resource allocation information corresponding to the at least two types of random access channels are obtained, the target parameter information is selected from the parameter information in accordance with the capability of the access device, the operating scenario of the access device and the frequency offset proportion of the random access channel, the random access channel is selected in accordance with the target parameter information, and then the random access signal is transmitted in accordance with the time-frequency resource allocation information. Through the parameter information, it is able for the random access channel bandwidth to match a power level of the satellite access device, so as to meet a requirement on a signal-to-noise ratio for the system. In addition, a parameter of the random access channel is selected in such a manner as to approximate to that for a ground 5G system, so it is able for a satellite mobile communication system to make full use of an industrial advantages of the ground 5G system for development.

The access device in the embodiments of the present disclosure is capable of implementing the above-mentioned method for selecting the random access channel at an access device side with a same technical effect, which will not be particularly defined herein.

Figure 5:
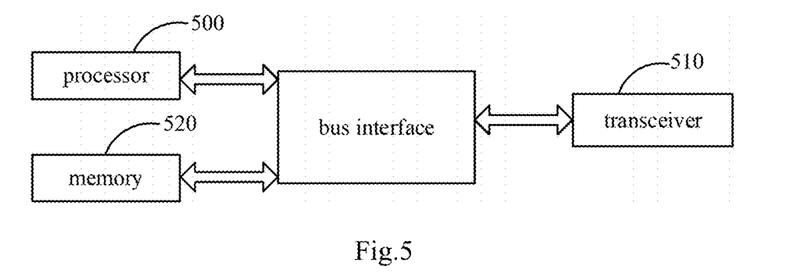
FIG. 5 is a block diagram of a network device according to an embodiment of the present disclosure.

As shown in FIG. 5, the present disclosure further provides in some embodiments a network device, e.g., a base station, which includes a memory 520, a processor 500, a transceiver 510, a bus interface, and a program stored in the memory 520 and executed by the processor 500. The processor 500 is configured to read the program in the memory 520, so as to: configure parameter information corresponding to at least two types of random access channels; and notify the parameter information and the time-frequency resource allocation information corresponding to the at least two types of random access channels to an access device. The parameter information corresponding to each type of random access channel includes a subcarrier spacing and a preamble sequence, a random access channel bandwidth obtained in accordance with the subcarrier spacing and a length of the preamble sequence is smaller than or equal to a maximum transmission bandwidth of a satellite access device, and the subcarrier spacing includes a reference value of a maximum frequency offset to be resisted by a satellite system.

In FIG. 5, bus architecture includes a number of buses and bridges connected to each other, so as to connect various circuits for one or more processors 500 and one or more memories 520. In addition, as is known in the art, the bus architecture may be used to connect any other circuits, such as a circuit for a peripheral device, a circuit for a voltage stabilizer and a power management circuit. The bus interface is provided, and the transceiver 510 consists of a plurality of elements, i.e., a transmitter and a receiver for communication with any other devices over a transmission medium. The processor 500 takes charge of managing the bus architecture as well as general processings. The memory 520 stores therein data for the operation of the processor 500.

In a possible embodiment of the present disclosure, the preamble sequences in the parameter information corresponding to different random access channels have different lengths, and/or the subcarrier spacings in the parameter information corresponding to different random access channels are different.

In a possible embodiment of the present disclosure, the parameter information corresponding to each type of random access channel further includes repetition times of the preamble sequence of the random access channel, and the repetition times of the preamble sequence of the random access channel are associated with the length of the preamble sequence and a frequency offset proportion of the random access channel.

In a possible embodiment of the present disclosure, the repetition times of the preamble sequence are in reverse proportion to a length of the preamble sequence, and in direct proportion to a frequency offset proportion of the random access channel.

In a possible embodiment of the present disclosure, the maximum transmission bandwidth of the satellite access device includes a bandwidth defined by a ground communications system and a bandwidth supported by the satellite system.

According to the network device in the embodiments of the present disclosure, the parameter information and the time-frequency resource allocation information corresponding to the at least two types of random access channels are configured, and then notified to the access device. Through the parameter information, it is able for the random access channel bandwidth to match a power level of the satellite access device, so as to meet a requirement on a signal-to-noise ratio for the system. In addition, a parameter of the random access channel is selected in such a manner as to approximate to that for a ground 5G system, so it is able for a satellite mobile communication system to make full use of an industrial advantages of the ground 5G system for development.

The program is executed by the processor 500, so as to implement the above-mentioned method for configuring the random access channel at a network device side with a same technical effect, which will not be particularly defined herein.

The present disclosure further provides in some embodiments a computer-readable storage medium storing a computer program. The computer program is executed by a processor, so as to: configure parameter information and time-frequency resource allocation information corresponding to at least two types of random access channels; and notify the parameter information and the time-frequency resource allocation information corresponding to the at least two types of random access channels to an access device. The parameter information corresponding to each type of random access channel includes a subcarrier spacing and a preamble sequence, a random access channel bandwidth obtained in accordance with the subcarrier spacing and a length of the preamble sequence is smaller than or equal to a maximum transmission bandwidth of a satellite access device, and the subcarrier spacing includes a reference value of a maximum frequency offset to be resisted by a satellite system.

The program is executed by the processor so as to implement the above-mentioned method for configuring the random access channel at a network device side with a same technical effect, which will not be particularly defined herein.

Figure 6:
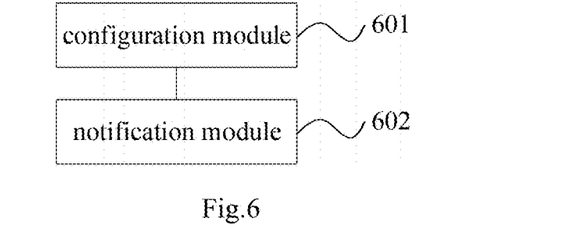
FIG. 6 is a schematic view showing modules of the network device according to an embodiment of the present disclosure.

As shown in FIG. 6, the present disclosure further provides in some embodiments a network device, which includes: a configuration module 601 configured to configure parameter information and time-frequency resource allocation information corresponding to at least two types of random access channels; and a notification module 602 configured to notify the parameter information and the time-frequency resource allocation information corresponding to the at least two types of random access channels to an access device. The parameter information corresponding to each type of random access channel includes a subcarrier spacing and a preamble sequence, a random access channel bandwidth obtained in accordance with the subcarrier spacing and a length of the preamble sequence is smaller than or equal to a maximum transmission bandwidth of a satellite access device, and the subcarrier spacing includes a reference value of a maximum frequency offset to be resisted by a satellite system.

In a possible embodiment of the present disclosure, the preamble sequences in the parameter information corresponding to different random access channels have different lengths, and/or the subcarrier spacings in the parameter information corresponding to different random access channels are different.

In a possible embodiment of the present disclosure, the parameter information corresponding to each type of random access channel further includes repetition times of the preamble sequence of the random access channel, and the repetition times of the preamble sequence of the random access channel are associated with the length of the preamble sequence and a frequency offset proportion of the random access channel.

In a possible embodiment of the present disclosure, the repetition times of the preamble sequence are in reverse proportion to a length of the preamble sequence, and in direct proportion to a frequency offset proportion of the random access channel.

In a possible embodiment of the present disclosure, the maximum transmission bandwidth of the satellite access device includes a bandwidth defined by a ground communications system and a bandwidth supported by the satellite system.

According to the network device in the embodiments of the present disclosure, the parameter information corresponding to the at least two types of random access channels are configured, and then notified to the access device. Through the parameter information, it is able for the random access channel bandwidth to match a power level of the satellite access device, so as to meet a requirement on a signal-to-noise ratio for the system. In addition, a parameter of the random access channel is selected in such a manner as to approximate to that for a ground 5G system, so it is able for a satellite mobile communication system to make full use of an industrial advantages of the ground 5G system for development.

The network device in the embodiments of the present disclosure is capable of implementing the above-mentioned method for configuring the random access channel at a network device side with a same technical effect, which will not be particularly defined herein.

It should be appreciated that, in the embodiments of the present disclosure, serial numbers of the steps shall not be used to define the order of the steps, and instead, the order of the steps shall be determined in accordance with their functions and internal logics, which should not constitute any limitation on the embodiments of the present disclosure.

The above are optional implementations of the present disclosure. It should be noted that for those of ordinary skill in the art, various improvements and modifications can be made without departing from the principles of the present disclosure, and these modifications and improvements shall also fall within the scope of the present disclosure.

What is claimed is:

1. A method for selecting a random access channel for an access device, comprising:
obtaining parameter information and time-frequency resource allocation information corresponding to at least two types of random access channels, the parameter information corresponding to each type of random access channel comprising a subcarrier spacing and a preamble sequence, a random access channel bandwidth obtained in accordance with the subcarrier spacing and a length of the preamble sequence being smaller than or equal to a maximum transmission bandwidth of a satellite access device, the subcarrier spacing comprising a reference value of a maximum frequency offset to be resisted by a satellite system;
selecting target parameter information from the parameter information in accordance with a capability of the access device, an operating scenario of the access device and a frequency offset proportion of the random access channel; and
selecting a random access channel in accordance with the target parameter information, and transmitting a random access signal in accordance with the time-frequency resource allocation information.

2. The method according to claim 1, wherein the selecting the target parameter information from the parameter information in accordance with the capability of the access device, the operating scenario of the access device and the frequency offset proportion of the random access channel comprises:
selecting a target random access channel bandwidth smaller than or equal to a maximum transmission bandwidth of the access device from the parameter information in accordance with the capability of the access device;
selecting from the parameter information a target subcarrier spacing greater than the maximum frequency offset to be resisted by the access device in accordance with the operating scenario of the access device; and
selecting a target preamble sequence from the parameter information in accordance with the frequency offset proportion of the random access channel.

3. The method according to claim 2, wherein the selecting the target preamble sequence from the parameter information in accordance with the frequency offset proportion of the random access channel comprises:
in the case that there is a plurality of same preamble sequences in the parameter information, selecting preamble sequences with a minimum frequency offset proportion from the plurality of same preamble sequences to obtain a target preamble sequence set;
in the case that the target preamble sequence set comprises different preamble sequences, determining the target preamble sequence in accordance with a frequency offset proportion of a random access channel corresponding to a shortest preamble sequence in the target preamble sequence set; and
in the case that the target preamble sequence set does not comprise different preamble sequences, determining the preamble sequence in the target preamble sequence set as the target preamble sequence.

4. The method according to claim 3, wherein the determining the target preamble sequence in accordance with the frequency offset proportion of the random access channel corresponding to the shortest preamble sequence in the target preamble sequence set comprises:
in the case that the frequency offset proportion of the random access channel corresponding to the shortest preamble sequence in the target preamble sequence set is smaller than or equal to a first predetermined threshold, selecting the shortest preamble sequence as the target preamble sequence;
in the case that the frequency offset proportion of the random access channel corresponding to the shortest preamble sequence in the target preamble sequence set is greater than or equal to a second predetermined threshold, selecting a longest preamble sequence as the target preamble sequence; and
in the case that the frequency offset proportion of the random access channel corresponding to the shortest preamble sequence in the target preamble sequence set is greater than the first predetermined threshold and smaller than the second predetermined threshold, selecting a preamble sequence corresponding to a minimum random access channel bandwidth as the target preamble sequence, the second predetermined threshold being greater than the first predetermined threshold.

5. The method according to claim 1, wherein the parameter information corresponding to each type of random access channel further comprises repetition times of the preamble sequence of the random access channel, wherein subsequent to obtaining the parameter information corresponding to the at least two types of random access channels, the method further comprises:
determining the repetition times of the preamble sequence of the random access channel in accordance with the parameter information.

6. The method according to claim 5, wherein the repetition times of the preamble sequence are in reverse proportion to a length of the preamble sequence, and in direct proportion to a frequency offset proportion of the random access channel.

7. A method for configuring a random access channel for a network device, comprising:
configuring parameter information and time-frequency resource allocation information corresponding to at least two types of random access channels; and
notifying the parameter information and the time-frequency resource allocation information corresponding to the at least two types of random access channels to an access device,
wherein the parameter information corresponding to each type of random access channel comprises a subcarrier spacing and a preamble sequence, a random access channel bandwidth obtained in accordance with the subcarrier spacing and a length of the preamble sequence is smaller than or equal to a maximum transmission bandwidth of a satellite access device, and the subcarrier spacing comprises a reference value of a maximum frequency offset to be resisted by a satellite system.

8. The method according to claim 7, wherein the preamble sequences in the parameter information corresponding to different random access channels have different lengths, and/or the subcarrier spacings in the parameter information corresponding to different random access channels are different.

9. The method according to claim 7, wherein the parameter information corresponding to each type of random access channel further comprises repetition times of the preamble sequence of the random access channel, and the repetition times of the preamble sequence of the random access channel are associated with the length of the preamble sequence and a frequency offset proportion of the random access channel.

10. The method according to claim 9, wherein the repetition times of the preamble sequence are in reverse proportion to a length of the preamble sequence, and in direct proportion to a frequency offset proportion of the random access channel.

11. The method according to claim 7, wherein the maximum transmission bandwidth of the satellite access device comprises a bandwidth defined by a ground communications system and a bandwidth supported by the satellite system.

12. An access device, comprising a transceiver, a memory, a processor, and a program stored in the memory and capable of being executed by the processor, wherein the processor is configured to execute the program to:
obtain parameter information and time-frequency resource allocation information corresponding to at least two types of random access channels, the parameter information corresponding to each type of random access channel comprising a subcarrier spacing and a preamble sequence, a random access channel bandwidth obtained in accordance with the subcarrier spacing and a length of the preamble sequence being smaller than or equal to a maximum transmission bandwidth of a satellite access device, the subcarrier spacing comprising a reference value of a maximum frequency offset to be resisted by a satellite system;
select target parameter information from the parameter information in accordance with a capability of the access device, an operating scenario of the access device and a frequency offset proportion of the random access channel; and
select a random access channel in accordance with the target parameter information, and transmit a random access signal in accordance with the time-frequency resource allocation information.

13. The access device according to claim 12, wherein when selecting the target parameter information from the parameter information in accordance with the capability of the access device, the operating scenario of the access device and the frequency offset proportion of the random access channel, the processor is further configured to execute the program to:
select a target random access channel bandwidth smaller than or equal to a maximum transmission bandwidth of the access device from the parameter information in accordance with the capability of the access device;
select from the parameter information a target subcarrier spacing greater than the maximum frequency offset to be resisted by the access device in accordance with the operating scenario of the access device; and
select a target preamble sequence from the parameter information in accordance with the frequency offset proportion of the random access channel.

14. The access device according to claim 13, wherein when selecting the target preamble sequence from the parameter information in accordance with the frequency offset proportion of the random access channel, the processor is further configured to execute the program to:
in the case that there is a plurality of same preamble sequences in the parameter information, select preamble sequences with a minimum frequency offset proportion from the plurality of same preamble sequences to obtain a target preamble sequence set;
in the case that the target preamble sequence set comprises different preamble sequences, determine the target preamble sequence in accordance with a frequency offset proportion of a random access channel corresponding to a shortest preamble sequence in the target preamble sequence set; and
in the case that the target preamble sequence set does not comprise different preamble sequences, determine the preamble sequence in the target preamble sequence set as the target preamble sequence.

15. The access device according to claim 14, wherein when determining the target preamble sequence in accordance with the frequency offset proportion of the random access channel corresponding to the shortest preamble sequence in the target preamble sequence set, the processor is further configured to execute the program to:
in the case that the frequency offset proportion of the random access channel corresponding to the shortest preamble sequence in the target preamble sequence set is smaller than or equal to a first predetermined threshold, select the shortest preamble sequence as the target preamble sequence;
in the case that the frequency offset proportion of the random access channel corresponding to the shortest preamble sequence in the target preamble sequence set is greater than or equal to a second predetermined threshold, select a longest preamble sequence as the target preamble sequence; and in the case that the frequency offset proportion of the random access channel corresponding to the shortest preamble sequence in the target preamble sequence set is greater than the first predetermined threshold and smaller than the second predetermined threshold, select a preamble sequence corresponding to a minimum random access channel bandwidth as the target preamble sequence, the second predetermined threshold being greater than the first predetermined threshold.

16. The access device according to claim 12, wherein the parameter information corresponding to each type of random access channel further comprises repetition times of the preamble sequence of the random access channel, wherein subsequent to obtaining the parameter information corresponding to the at least two types of random access channels, the processor is further configured to execute the program to determine the repetition times of the preamble sequence of the random access channel in accordance with the parameter information.

17. The access device according to claim 16, wherein the repetition times of the preamble sequence are in reverse proportion to a length of the preamble sequence, and in direct proportion to a frequency offset proportion of the random access channel.

18. A network device, comprising a transceiver, a memory, a processor, and a program stored in the memory and capable of being executed by the processor, wherein the processor is configured to execute the program to implement the method according to claim 7.

19. The network device according to claim 18, wherein the preamble sequences in the parameter information corresponding to different random access channels have different lengths, and/or the subcarrier spacings in the parameter information corresponding to different random access channels are different.

20. The network device according to claim 18, wherein the parameter information corresponding to each type of random access channel further comprises repetition times of the preamble sequence of the random access channel, and the repetition times of the preamble sequence of the random access channel are associated with the length of the preamble sequence and a frequency offset proportion of the random access channel.

* * * * *